Patented Apr. 25, 1939

2,155,733

UNITED STATES PATENT OFFICE 2,155,733

GELATIN

Roy C. Newton and Frank L. De Beukelaer, Chicago, Ill., assignors to Industrial Patents Corporation, Chicago, Ill., a corporation of Delaware No Drawing. Application May 28, 1936, Serial No. 82,280

5 Claims. (Cl. 260—118)

This invention relates to a method of drying gelatin in small subdivisions and to the product resulting from the practice of the method.

One of the objects of the invention is to provide a method for the rapid drying of gelatin stock irrespective of weather conditions.

Another object of the invention is to provide a pearl type gelatin product which is not case hardened and which will dissolve readily either in the pearl form or after grinding.

In our United States Patent No. 2,024,131 entitled Preparation of glue, which issued December 10, 1935, we describe and claim a method of drying glue and a glue product of the pearl type which is not case hardened and which will dissolve readily.

The present invention is concerned specifically with the treatment of gelatin and with the product of such treatment.

We have discovered that gelatin may be prepared in the form of hollow spheres, bringing about a great increase in the specific surface of dry gelatin over a granular condition and reducing the hydration period to an almost instantaneous process. This is of great practical importance, permitting gelatin to be dissolved in less time than formerly and at lower temperatures, whereby the original strength and viscosity of the gelatin is conserved.

In carrying out the method of the present invention, concentrated gelatin liquor as obtained from the evaporator in the conventional manufacture of gelatin is continuously dropped upon a bed of dry granular gelatin or upon a bed of powdered gelatin. The drops of gelatin resting on the dried finely subdivided gelatin are then covered with granular or powdered gelatin fed from a hopper over the conveyor. The gelatin pearls may then be recovered from the mass of granular or powdered gelatin by screening and dried in any desired manner.

Due to the concentrating effect of the water absorbing process brought about by the dry gelatin and the gelation tendency of gelatin, the drops of gelatin liquor set to a jelly almost instantaneously upon contact with the granular or powdered gelatin. Upon recovery from the dried gelatin, the drops are in the form of small jellied spheres completely coated with solid particles picked up from the dried gelatin. The coated jellied spheres are then dried in any suitable drier.

During the drying process, the jellied spheres become spherical, thin-walled shells coated with particles picked up during the pearling stage of the process. The end product, a residual shell, which is the skeleton of the original drop, may be marketed in the spherical form or it may be readily powdered or granulated with simple crushing equipment.

The solids content of gelatin liquors is in general lower than that of corresponding glue liquors mainly due to the fact that the evaporators used to concentrate gelatin liquors are not capable of removing further moisture efficiently without degrading the product. This fact renders the conventional drying of gelatin a difficult process which must be carefully carried out under precise conditions of manufacture.

The method of the present invention provides a simple solution to the gelatin drying problem. The product of the present invention is novel as to form and other characteristics, including ready solubility.

We claim:

1. The method of forming hollow spheres of dry gelatin which comprises forming drops of gelatin liquor and coating each individual drop with particles of dried gelatin, permitting the gelatin liquor to set to a jelly, and thereafter drying the individual jellied drops.

2. The method of forming hollow spheres of dry gelatin which comprises forming drops of gelatin liquor and coating each individual drop with fine particles of dried gelatin such that substantially all the particles adhering to the individual drops of gelatin liquor are each in contact with the gelatin liquor and with the outer atmosphere whereby drying by capillary action is facilitated and thereafter drying the individual coated drops.

3. A gelatin product consisting of hollow spheres of gelatin.

4. A gelatin product consisting of hollow shells of gelatin.

5. A gelatin product consisting of hollow shells of gelatin having a coating of gelatin particles.

ROY C. NEWTON.
FRANK L. DE BEUKELAER.